United States Patent [19]

Winfree et al.

[11] Patent Number: 5,615,548

[45] Date of Patent: Apr. 1, 1997

[54] DUAL ROTOR PULSE DETONATION APPARATUS

[75] Inventors: Don D. Winfree, Keller; Louis G. Hunter, Jr., Fort Worth, both of Tex.

[73] Assignee: Lockheed Martin Corporation, Fort Worth, Tex.

[21] Appl. No.: 507,114

[22] Filed: Jul. 26, 1995

[51] Int. Cl.[6] ................................................ F02G 1/00
[52] U.S. Cl. ..................... 60/39.78; 60/247; 60/39.81
[58] Field of Search .................... 60/39.38, 39.77, 60/39.78, 39.81, 247

[56] References Cited

U.S. PATENT DOCUMENTS

| | | | |
|---|---|---|---|
| 2,580,908 | 1/1952 | Goddard | 60/39.77 |
| 3,634,778 | 1/1972 | Melikian et al. | |
| 3,812,783 | 5/1974 | Yang et al. | |
| 4,741,154 | 5/1988 | Eidelman | |
| 4,870,903 | 10/1989 | Carel et al. | |
| 4,976,232 | 12/1990 | Coates | |
| 4,989,558 | 2/1991 | Coates | |
| 4,989,576 | 2/1991 | Coates | |
| 5,109,814 | 5/1992 | Coates | |
| 5,345,748 | 9/1994 | Bussing | |
| 5,473,885 | 12/1995 | Hunter, Jr. et al. | 60/39.78 |

FOREIGN PATENT DOCUMENTS 1476926  2/1970  Germany ................. 60/39.77

Primary Examiner—Charles G. Freay
Attorney, Agent, or Firm—James E. Bradley

[57] ABSTRACT

A pulse detonator particularly for an aircraft power supply has a tubular housing. A valve sleeve rotates within the bore of the housing. The valve sleeve and housing have ports which align with each other at least once per revolution. A manifold is mounted to the exterior of the housing. The manifold has outer valves which open to admit fuel and oxygen simultaneously with the alignment of the valve sleeve ports with the housing ports. The fuel and oxygen flow into a detonation chamber where they mix. Igniters ignite the mixture to create a detonation wave which passes out the downstream end.

15 Claims, 3 Drawing Sheets

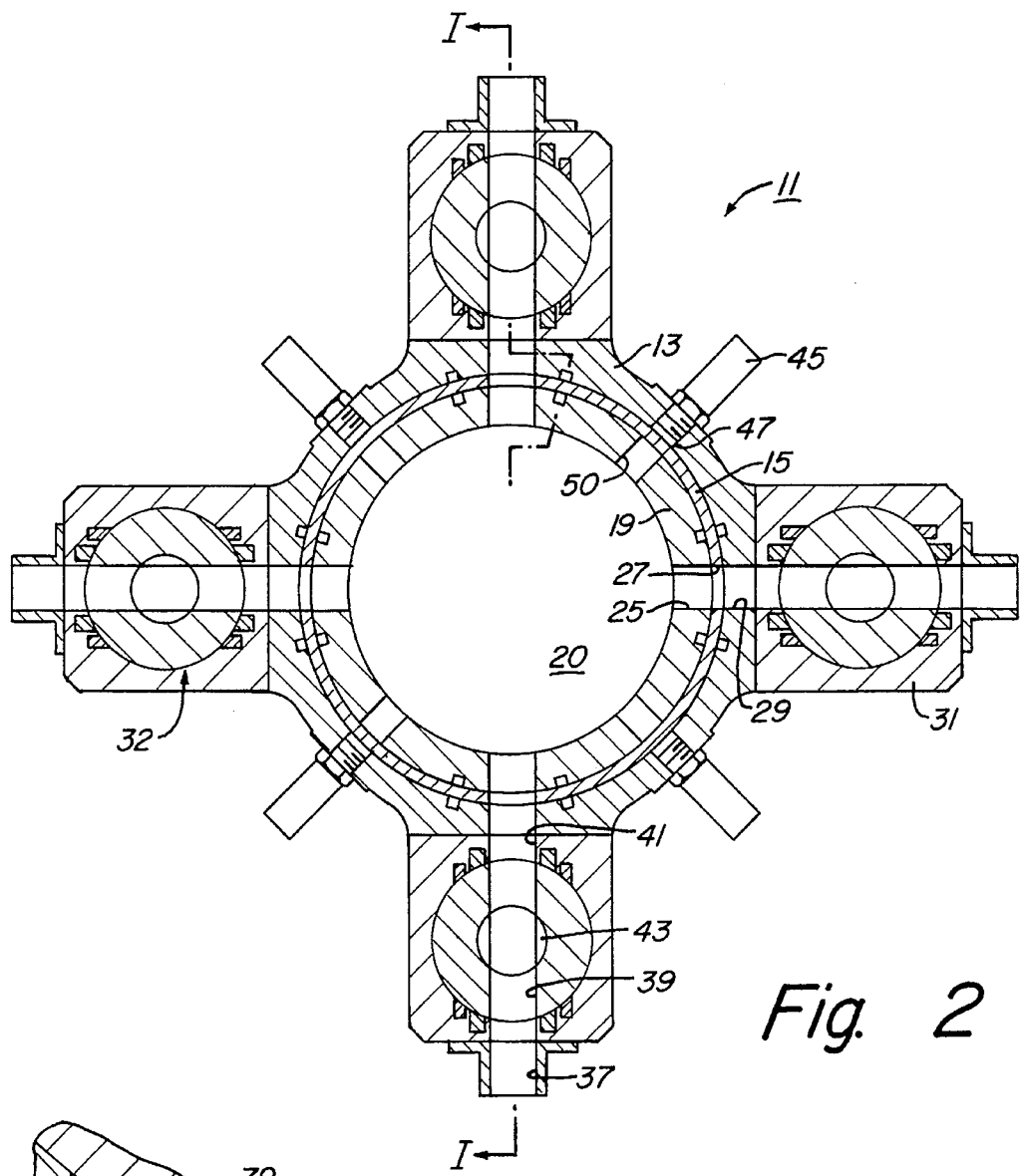
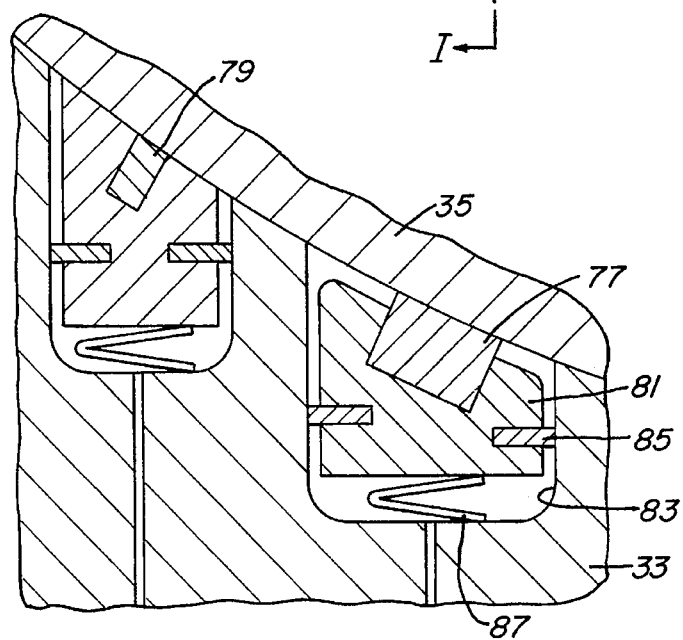

DUAL ROTOR PULSE DETONATION APPARATUS

BACKGROUND OF THE INVENTION

1. Field of the Invention

This invention relates in general to power sources, and in particular to pulse detonation engines such as for aircraft, missiles and rockets.

2. Description of the Prior Art

A pulse detonation engine is an apparatus which produces a high pressure exhaust from a series of repetitive detonations within a detonation chamber. The process is a constant volume heat addition process. A gaseous fuel is detonated within a chamber, causing a pulse detonation wave which propagates at supersonic speeds. The supersonic speeds approach or exceed Chapman Jouguet detonation velocities. This speed is to be distinguished from lower quality shock or deflagration expansion waves which travel supersonically at approximately one third of the Chapman Jouguet detonation velocities. The detonation wave compresses the fluid within the chamber, increasing its pressure, density and temperature. As the detonation wave passes out the open rearward end, thrust is created. The cycle is then repeated.

At high speeds, such as Mach 2 to about Mach 3.5, such an engine would be theoretically more efficient than conventional turbojets because the engine does not require compressors or turbines. A pulse detonation engine supplying the same amount or more of thrust as a conventional gas turbine engine would theoretically weigh less. Also, a pulse detonation engine could be used as a propulsion system for a rocket.

Another prior art engine, known as a pulse jet engine, was employed in World War II. That engine relied on slow moving deflagration, not detonation. The deflagration waves are subsonic, not supersonic waves. A pulse jet engine is not a pulse detonation engine.

Although theoretically desirable, to applicant's knowledge there are no pulse detonation engines being used as propulsion devices at this time. The reason may be the problems resulting from very high detonation chamber temperatures, approximately 3,500° F. Also, initiating repetitive detonations is a problem. The detonation chamber must have an inlet port for supplying fuel, and the inlet port must close just before the detonation occurs. Very high pressures occur during the detonation. The valves must be capable of sealing against the high pressures under the high temperatures.

SUMMARY OF THE INVENTION

The pulse detonation apparatus in this invention has a tubular housing with at least one housing port. A valve sleeve is rotatably mounted within the bore of the housing. The valve sleeve has at least one valve sleeve port. A drive means will rotate the valve sleeve relative to the housing, so that the valve sleeve port will register with the housing port at least once per revolution.

A manifold is mounted stationarily to the exterior of the housing and has a manifold port in communication with the housing port. At least one outer valve is located in the manifold. The outer valve in the manifold is a rotary valve, preferably having a spherical convex element located within a spherical concave seat. The outer valve is synchronized with the valve sleeve for opening the manifold port when the housing port is open, admitting fuel and oxygen through the manifold port, housing port, and valve sleeve port to the detonation chamber. Igniters detonate the fuel mixture when the valve sleeve and housing ports are closed, creating a detonation wave which passes out the open downstream end of the detonation chamber.

A liner is mounted stationarily to the housing within the valve sleeve. The liner has a liner port which is radially aligned with the housing and manifold ports. The liner has an upstream end wall with a purge port. The valve sleeve also has an upstream end wall with a purge port. The valve sleeve purge port aligns with the liner purge port to admit purge fluid after the detonation has occurred and before the next cycle.

DESCRIPTION OF THE DRAWINGS

FIG. 2 is a sectional view of the pulse detonation apparatus of FIG. 1, taken along the line II—II of FIG. 1.

FIG. 3 is an enlarged partial sectional view of the seals employed with one of the outer valve elements.

DETAILED DESCRIPTION OF THE INVENTION

Figure 1:
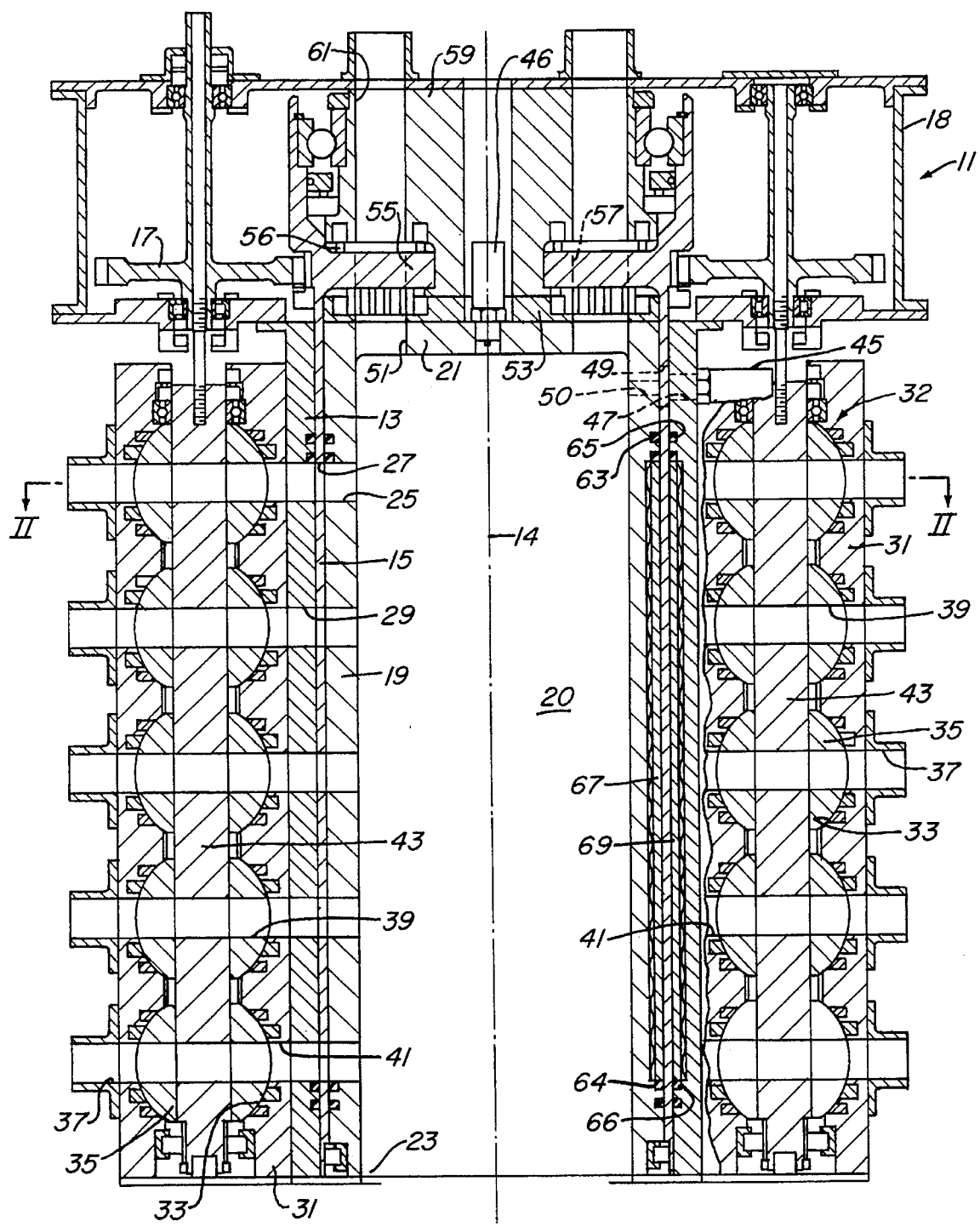
FIG. 1 is a sectional view illustrating a pulse detonation apparatus contracted in accordance with this invention and taken along the line I—I of FIG. 2.

Referring to FIG. 1, pulse detonator 11 has a tubular cylinder or housing 13. Housing 13 has a bore with a longitudinal axis 14. A valve sleeve 15 is rotatably carried in the bore of housing 13, concentric with axis 14. Valve sleeve 15 is also a cylinder, having its exterior closely received within housing 13. A gear train 17 located within a gear case 18 will be connected to an external drive source for rotating valve sleeve 15 relative to the stationary housing 13.

A cylindrical liner 19 is stationarily mounted within the inner diameter of sleeve 15. Liner 19 is secured by fasteners (not shown) to the gear case 18. The bore or interior of liner 19 serves as a detonation chamber 20. Liner 19 is made of a material that withstands high temperatures and has sufficient strength to withstand the high pressures created. Liner 19 has an upstream end wall 21 which forms the upstream end wall of detonation chamber 20. Liner 19 has an open downstream end 23 through which detonation pulses discharge.

Liner 19 has a plurality of liner ports 25 extending through its sidewall. As shown in FIG. 2, there are four sets of liner ports 25, each set spaced 90 degrees apart from each other. As shown in FIG. 1, each set has five liner ports 19 evenly spaced apart from each other along longitudinal axis 14. Valve sleeve 15 has a plurality of valve sleeve ports 27 which are spaced in the same manner as liner ports 25. There are four radially spaced sets of valve sleeve ports 27, each set having five ports 27 spaced along longitudinal axis 14. Similarly, housing 13 has a port 29 radially aligned with each of the liner ports 25. As gear train 17 rotates valve sleeve 15, valve sleeve ports 27 will align with liner ports 25 and housing ports 29 four times per revolution.

Figure 4:
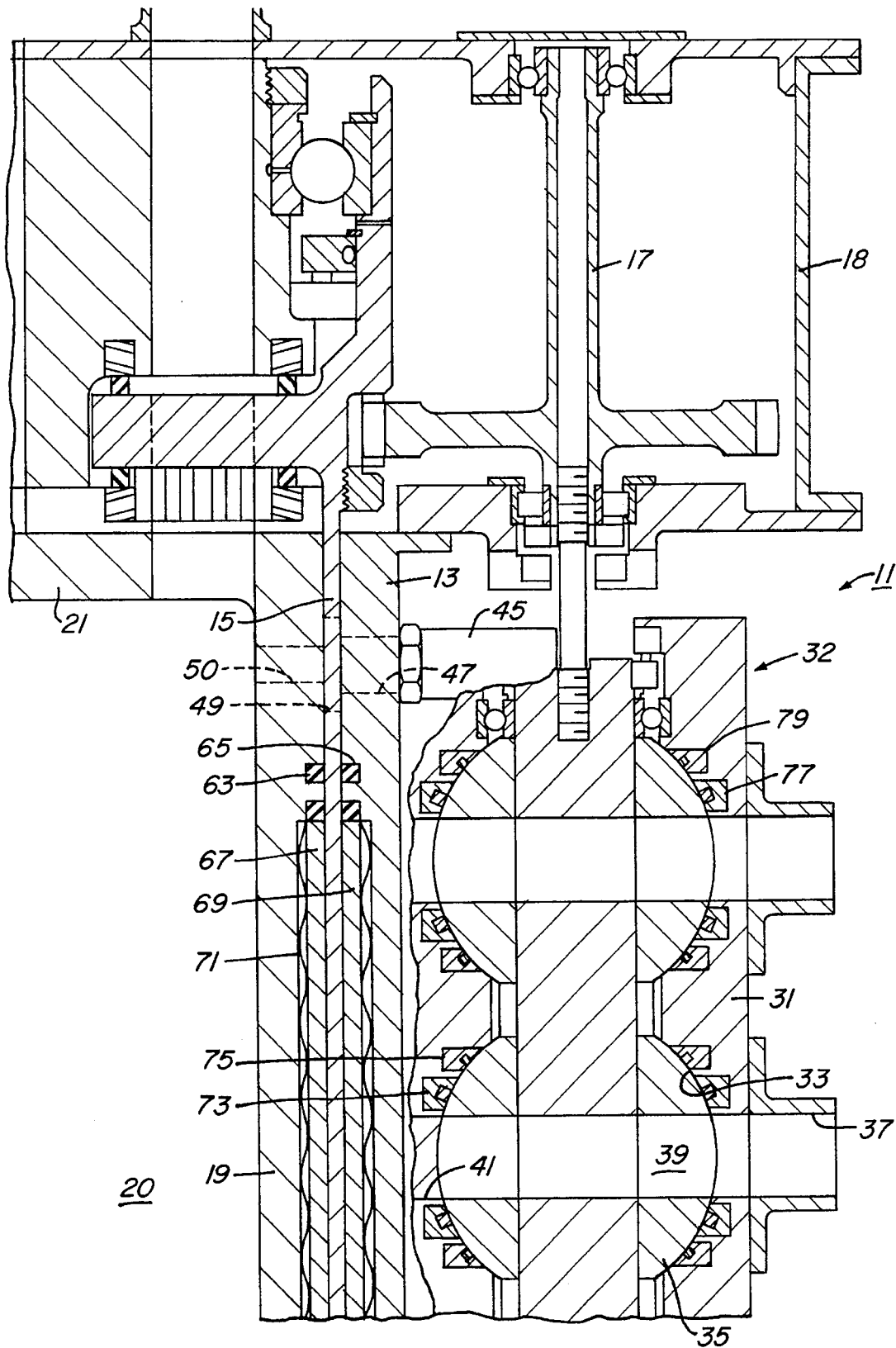
FIG. 4 is an enlarged partial view of a portion of the pulse detonation apparatus of FIG. 1.

Four manifolds 31 are mounted to the exterior of housing 13. Manifolds 31 are spaced 90 degrees apart from each other, as shown in FIG. 2. Each manifold 31 has five outer valves 32, each of which corresponds to one of the liner ports 25 and housing ports 29. Referring to FIG. 4, each of the outer valves 32 has a concave seat 33 which may be generally spherical or elliptical. A mating convex valve element 35 is rotatably carried within each seat 33. Manifold 31 has a manifold inlet port 37 that is located on a radial line with one of the housing ports 29 and liner ports 25. Valve element 35 has a valve passage 39 which extends through valve element 35 perpendicular to longitudinal axis 14. Manifold 31 has a manifold outlet port 41 for each of the valve inlet ports 37, the outlet ports 41 being radially aligned with one of the manifold inlet ports 37.

As the valve element 35 rotates, valve passage 39 will align and communicate manifold inlet port 37 with manifold outlet port 41 twice per revolution. An outer valve drive means includes a shaft 43 which extends parallel to longitudinal axis 14. Shaft 43 extends through each of the valve elements 35 and is rigidly secured to the valve elements 35 for rotating. Shaft 43 is driven by drive train 17. The rotation speed of shaft 43 is synchronized with the rotation speed of valve sleeve 15 so that valve passage 39 will open the manifold ports 37, 41 simultaneously with the opening of the liner ports 25 and housing ports 29. In the drawings, the ports 25, 29, 37, and 41 are shown in the open position.

The manifold inlet ports 37 are connected to sources of fuel and oxydizer. The fuel will normally be gaseous hydrocarbon unmixed with oxydizer. Pure oxygen will be supplied to some of the other manifold inlet ports 37. Preferably, each manifold inlet port 37 which is supplied with fuel will be spaced 180 degrees apart from a manifold inlet port 37 supplied with an oxidizer. The opposed inward flows of fuel and oxidizer enhance mixing. Also, the fuel and oxygen inlets could be staggered along the axis 14. For example, the most upstream four valves 32 could be supplied with fuel at the zero and 180 degree valve locations and oxygen at the 90 and 270 degree valve locations. The second most upstream group of four valves 32 could be supplied with fuel at the 90 and 270 degree valve locations and oxygen at the zero and 180 degree valve locations. In some instances, air may be supplied to some of the inlet ports 37, particularly those located toward the open downstream end 23. The unmixed fuel and oxygen will flow into the detonation chamber 20 where they mix for detonation.

Detonation is performed by igniters 45, 46, which may be either spark-type or lasers. As shown in FIGS. 1 and 2, four radially oriented igniters 45 are spaced 90 degrees apart from each other near liner upstream end wall 21. Igniters 45 are contained within a single radial plane. Igniter 46 is optional and is shown axially oriented in liner upstream end wall 21 on longitudinal axis 14. If igniters 45 are lasers rather than spark-type, they will emit a beam of light through a lens 47 contained in housing 13, which focuses the beam on axis 14. Valve sleeve 15 has four igniter ports 49 which will register with lenses 47 and with igniter ports 50 in liner 19 to allow the beams to pass through four times per revolution of valve sleeve 15. Valve sleeve igniter ports 49 are positioned so that they open the path for each igniter 45 after the liner ports 25 have been closed by valve sleeve 15. Valve sleeve 15 will cover lenses 47 during the detonation phase of the cycle.

Referring again to FIGS. 1 and 4, pulse detonator 11 has a purge means for purging the detonation chamber 20 of combustion products after the detonation has occurred and before the next cycle begins. This includes a plurality of purge ports 51 located within liner upstream end wall 21. Preferably, there are at least two purge ports 51. A flame arrester 53 is mounted to each purge port 51 to reduce the possibility of any flames from flowing upstream. Valve sleeve 15 has an upstream end wall 55 which is located directly upstream from liner upstream end wall 21. Valve sleeve upstream end wall 55 is parallel to liner end wall 21 and perpendicular to longitudinal axis 14. Valve sleeve upstream wall 55 rotates with valve sleeve 15 and is sealed on both the upstream and downstream sides by spring-biased seals 56.

A plurality of valve sleeve purge ports 57 extend through valve sleeve upstream wall 55. A purge manifold 59 directs a purge fluid, such as air, from the upstream end of gear case 18 to the valve sleeve purge ports 57. Four times per revolution, valve sleeve purge ports 57 will open liner purge ports 51, admitting a purge fluid. Valve sleeve purge ports 57 are positioned so that they will admit the purge fluid immediately after each detonation occurs and before the valve sleeve ports 27 and outer valves 32 admit the next mixture of fuel and oxydizer.

A seal means seals between valve sleeve 15 and liner 19 and between housing 13 and valve sleeve 15. As shown also in FIG. 4, the seal means includes a pair of inner upstream circular seals 63 and a pair of outer upstream circular seals 65. Upstream seals 63, 65 are located upstream of all of the valve sleeve ports 27. There are similar downstream seals 64, 66 located downstream of all of the valve sleeve ports 27. Seal 63, 65 and 64, 66 are circular and perpendicular to axis 14. The inner seals 63 are located within grooves in liner 19. The outer seals 65 are located within grooves in housing 13. Seal 63, 65 slidingly engage the inner and outer diameters of valve sleeve 15. Downstream seals 64, 66 are identical to upstream seals 63, 65.

A plurality of linear seals 67, 69 extend parallel to axis 14, each having an upstream end abutting the upstream seals 63, 65 and a downstream end abutting the downstream seals 64, 66. The inner linear seals 67 are located within longitudinal grooves formed in liner 19. The outer linear seals 69 are located within longitudinal grooves formed in housing 13. A wavy spring 71 in each of the grooves biases the seals 67, 69 into sliding sealing engagement with valve sleeve 15. When valve sleeve ports 27 are rotated out of alignment with liner ports 25, seals 67, 69 prevent the detonated gases in detonation chamber from passing out of liner ports 25. Linear seals 67, 69 are metal seals capable withstanding high temperatures.

Referring still to FIG. 4, each outer valve 32 has a seal means for the valve passage 39. The seal means includes a primary inner seal 73 located within seat 33 and surrounding a manifold outlet port 41. A secondary inner seal 75, slightly larger in diameter, surrounds primary seal 73. Similarly, a primary outer seal 77 surrounds each manifold inlet port 37. A secondary outer seal 79 surrounds each primary outer seal 77.

Referring to FIG. 3, a portion of one of the port valves 32 is shown illustrating one of the primary outer seals 77 and secondary outer seals 79. The inner seals 73, 75 are constructed the same. Each seal 77, 79 is mounted to a carrier 81. Each carrier 81 is carried in a circular groove 83 of rectangular transverse cross section. Piston rings 85 seal carrier 81 within groove 83. A spring 87 located at the base of each groove 83 urges carrier 81 outward, maintaining each seal 77, 79 in tight sealing engagement with one of the valve elements 35.

Primary seal 77 will be subjected to higher pressures and higher temperatures than secondary seal 79 because primary seal 77 is closer to inlet port 37 than secondary seal 79. In the preferred embodiment, primary seal 77 has a greater thickness, resulting in more surface area per linear increment in contact with valve element 35 than secondary seal 79. The lesser thickness or cross sectional area of secondary seal 79, however, enables it to seal higher pressures. Some leakage past primary seal 77 is expected, but secondary seal 79 should completely seal against reactants from the detonation. Primary seal 77 is preferably of a higher temperature heat resistant material than secondary seal 79. For example, primary seal 77 may be of ceramic while secondary seal 79 may be of carbon.

In operation, an external power source will rotate drive train 17. This rotates outer valves 32 and valve sleeve 15. Unmixed fuel is supplied to several of the manifold inlet ports 37, including some of the inlet ports 37 near the upstream end. Pure oxygen will be supplied to some of the other inlet ports 37, including some of the inlet ports located near the upstream end. Because the four manifolds 31 are separate, the most upstream inlet port 37 of one manifold may be receiving oxygen, while the most upstream inlet port 37 of another manifold 31 may be receiving hydrocarbon fuel. If the pulse detonator 11 is employed as a rocket power source, fuel and oxygen will be supplied. If employed as power source within atmosphere, such as for an airplane, then some of the downstream inlet ports 37 will be supplied with air.

The fuel and oxygen will flow into detonation chamber 20 when manifold inlet ports 37, valve passage 39, manifold outlet ports 41, housing ports 29, valves sleeve ports 27, and liner ports 25 align. The fuel and oxygen mix immediately thereafter and liner ports 25 and valve passages 39 will close. Purge ports 51 will also be closed. The igniter ports 49 will align with igniter ports 50, 47, causing the igniters 45 to focus on axis 14. The focusing of the igniters 45 creates a spark which ignites the combustible fuel mixture in detonation chamber 20. This detonation creates a high temperature, high pressure, detonation wave which discharges out open downstream end 23, creating thrust. A reverberating expansion wave is created by the initial detonation wave. The expansion wave reflects off the upstream end wall 21 and discharges from the open downstream end 23, creating additional thrust. The closure of valve sleeve ports 27 and valve passages 39 eliminate hot products and hot metal from coming into contact with fuel or oxygen that has not yet been introduced into the detonation chamber 20.

Immediately after, but prior to liner ports 25 again opening, purge ports 51 open by alignment with the valve sleeve purge ports 57. Air supplied through purge manifold 59 will flow into detonation chamber 20. The purge air removes hot products and dilutes trapped reactants from detonation chamber 20. Immediately thereafter, liner ports 25 again open to repeat the process. The rotational speed of valve sleeve 15 is selected to create pulses at a rate of approximately 100 cycles per second.

The invention has significant advantages. Mixing the components of the fuel mixture in the detonation chamber adds safety to the apparatus. Flowing oxygen through some of the ports and hydrocarbon through other of the ports reduces the chance of an accidental explosion outside of the detonation apparatus. The dual seal arrangement provided by the valve sleeve and the outer valves further reduces the chance of an explosion exterior of the detonation chamber by eliminating hot products and metals from coming into contact with fuel or oxygen not yet introduced into the detonation chamber.

While the invention has been shown in only one of its forms, it should be apparent to those skilled in the art that it is not so limited, but is susceptible to various changes without departing from the scope of the invention.

We claim:

1. A pulse detonation apparatus, comprising in combination:

a tubular housing having an exterior, a cylindrical bore, and at least one housing port;

a valve sleeve rotatably and concentrically mounted within the cylindrical bore;

valve sleeve drive means for rotating the valve sleeve relative to the housing;

a detonation chamber located within the valve sleeve, having an upstream end wall and an open downstream end;

the valve sleeve having at least one valve sleeve port which registers with the housing port at least once per revolution to open the housing port;

a manifold mounted to the exterior of the housing, having a manifold port in communication with the housing port;

at least one outer valve located in the manifold, the outer valve being synchronized with the valve sleeve for opening the manifold port when the housing port is open, admitting fuel and oxygen through the manifold port, housing port, and valve sleeve port for providing a fuel mixture in the detonation chamber; and igniter means for detonating the fuel mixture when the valve sleeve port and housing port are closed to create a detonation wave for passing out the open downstream end of the detonation chamber.

2. The apparatus according to claim 1, wherein the detonation chamber comprises:

a tubular liner mounted stationarily to the housing within the valve sleeve, the liner having a liner port which is radially aligned with the housing port and manifold port.

3. The apparatus according to claim 1, wherein:

the upstream end wall of the detonation chamber has at least one detonation chamber purge port;

the valve sleeve has an upstream end wall parallel to the upstream end wall of the detonation chamber and which has at least one valve sleeve purge port which registers at least once per revolution with the detonation chamber purge port after the detonation has occurred and prior to admitting fuel and oxygen into the detonation chamber for a next cycle; and wherein the apparatus further comprises:

purge manifold means for admitting a purge fluid to the purge ports for purging the detonation chamber of combustion products.

4. The apparatus according to claim 1 wherein the outer valve comprises a rotary valve.

5. The apparatus according to claim 1 wherein the outer valve comprises:

a stationary seat stationarily mounted in the manifold and having a seat passage which aligns with the manifold port;

a rotary member rotatably carried in the seat and having a valve passage therethrough; and outer valve drive means for rotating the member to cyclically register the valve passage with the seat passage.

6. The apparatus according to claim 1, further comprising:

seal means located for sealing the valve sleeve port from communication with the housing port when the igniter means detonates the fuel mixture.

7. The apparatus according to claim 1, wherein the detonation chamber comprises:

a tubular liner mounted stationarily to the housing within the valve sleeve, the liner having a liner port which is radially aligned with the housing port and manifold port; and wherein the apparatus further comprises:

outer seal means located between an exterior surface of the valve sleeve and the bore of the housing for sealing the valve sleeve port from communication with the housing port when the igniter means detonates the fuel mixture; and inner seal means located between an interior surface of the valve sleeve and the liner for sealing the valve sleeve port from communication with the liner port when the igniter means detonates the fuel mixture.

8. A pulse detonation apparatus, comprising in combination:

a tubular housing having an exterior, a cylindrical bore having a longitudinal axis, and at least one housing port;

a valve sleeve rotatably and concentrically mounted within the cylindrical bore;

valve sleeve drive means for rotating the valve sleeve relative to the housing;

a liner stationarily mounted to the housing and located within the valve sleeve, defining a detonation chamber, the liner having an upstream end wall, an open downstream end, and at least one liner port which is radially aligned with the housing port;

the valve sleeve having at least one valve sleeve port which registers with the housing and liner ports at least once per revolution to open the housing port to the detonation chamber;

a manifold mounted to the exterior of the housing, having a manifold port in communication with the housing port;

at least one rotary outer valve located in the manifold;

outer valve drive means for rotating the outer valve in synchronization with the valve sleeve for opening the manifold port when the housing port is open, admitting fuel and oxygen through the manifold port, housing port, valve sleeve port, and liner port for providing a fuel mixture in the detonation chamber;

igniter means for detonating the fuel mixture when the valve sleeve port and housing port are closed to create a detonation wave for passing out the open downstream end of the detonation chamber; and seal means for sealing the valve sleeve port from communication with the housing port when the igniter means detonates the fuel mixture.

9. The apparatus according to claim 8, wherein the seal means comprises:

outer seal means located between an exterior surface of the valve sleeve and the bore of the housing for sealing the valve sleeve port from communication with the housing port when the igniter means detonates the fuel mixture; and inner seal means located between an interior surface of the valve sleeve and the liner for sealing the valve sleeve port from communication with the liner port when the igniter means detonates the fuel mixture.

10. The apparatus according to claim 8, wherein the seal means comprises:

a circular upstream seal located between an interior surface of the valve sleeve and the liner upstream of the liner port and perpendicular to the longitudinal axis;

a circular downstream seal located between an interior surface of the valve sleeve and the liner downstream of the liner port and perpendicular to the longitudinal axis; and a pair of circumferentially spaced apart straight linear seals extending between the forward and rearward seals parallel to the longitudinal axis for sealing on each side of the liner port.

11. The apparatus according to claim 8, wherein the seal means comprises:

a circular upstream seal located in a circular groove on an exterior surface of the liner upstream of the liner port and perpendicular to the longitudinal axis;

a circular downstream seal located in a circular groove on the exterior surface of the liner downstream of the liner port and perpendicular to the longitudinal axis;

a pair of circumferentially spaced apart straight linear seals extending in linear grooves on the liner between the forward and rearward seals parallel to the longitudinal axis for sealing on each side of the liner port; and spring means in each of the linear grooves for urging the linear seals into sealing engagement with the valve sleeve.

12. The apparatus according to claim 8 wherein the outer valve comprises:

a stationary seat stationarily mounted in the manifold and having a seat passage which aligns with the manifold port;

a rotary member rotatably carried in the seat and having a valve passage therethrough; and wherein the outer valve drive means rotates the member to cyclically register the valve passage with the seat passage.

13. The apparatus according to claim 8, wherein:

the upstream end wall of the liner has at least one detonation chamber purge port;

the valve sleeve has an upstream end wall parallel to the upstream end wall of the liner and which has at least one valve sleeve purge port which registers at least once per revolution with the detonation chamber purge port after the detonation has occurred and prior to admitting fuel and oxygen into the detonation chamber for a next cycle; and wherein the apparatus further comprises:

purge manifold means for admitting a purge fluid to the purge ports for purging the detonation chamber of combustion products.

14. A pulse detonation apparatus, comprising in combination:

a tubular housing having an exterior, a cylindrical bore having a longitudinal axis, and at least one housing port;

a valve sleeve rotatably and concentrically mounted within the cylindrical bore, the valve sleeve having an upstream end wall having at least one valve sleeve purge port;

valve sleeve drive means for rotating the valve sleeve relative to the housing;

a liner stationarily mounted to the housing and located within the valve sleeve, defining a detonation chamber, the liner having an upstream end wall having at least one liner purge port, an open downstream end, and at least one liner port which is radially aligned with the housing port;

the valve sleeve having at least one valve sleeve port which registers with the housing and liner ports at least once per revolution to open the housing port to the detonation chamber;

a manifold mounted to the exterior of the housing, having a manifold port in communication with the housing port;

a stationary seat stationarily mounted in the manifold and having a seat passage which aligns with the manifold port;

a rotary member rotatably carried in the seat and having a valve passage therethrough;

outer valve drive means for rotating the member to cyclically register the valve passage with the seat passage in synchronization with the valve sleeve for opening the manifold port when the housing port is open, admitting fuel and oxygen through the manifold port, housing port, valve sleeve port, and liner port, providing a fuel mixture in the detonation chamber;

igniter means for detonating the fuel mixture when the valve sleeve port and housing port are closed to create a detonation wave for passing out the open downstream end of the detonation chamber;

seal means for sealing the valve sleeve port from communication with the housing port when the igniter means detonates the fuel mixture;

a valve sleeve purge port and a liner purge port, the purge ports registering at least once per revolution with each other after the detonation has occurred and prior to admitting fuel and oxygen into the detonation chamber for a next cycle; and purge manifold means for admitting a purge fluid to the purge ports for purging the detonation chamber of combustion products.

15. The apparatus according to claim 14, wherein the seal means comprises:

a circular upstream seal located between an interior surface of the valve sleeve and the liner upstream of the liner port and perpendicular to the longitudinal axis;

a circular downstream seal located between an interior surface of the valve sleeve and the liner downstream of the liner port and perpendicular to the longitudinal axis; and a pair of circumferentially spaced apart straight linear seals extending between the upstream and downstream seals parallel to the longitudinal axis for sealing on each side of the liner port.

* * * * *